(12) United States Patent
Mahlich (10) Patent No.: US 8,418,603 B2
(45) Date of Patent: Apr. 16, 2013

(54) MULTI-PORTION CONTAINER FOR POWDERED DRINK CONSTITUENTS

(75) Inventor: Gotthard Mahlich, Kronberg (DE)

(73) Assignee: Eugster/Frismag AG, Amriswil (CH)

( * ) Notice: Subject to any disclaimer, the term of this patent is extended or adjusted under 35 U.S.C. 154(b) by 453 days.

(21) Appl. No.: 12/452,248

(22) PCT Filed: Jun. 12, 2008

(86) PCT No.: PCT/EP2008/004713
§ 371 (c)(1),
(2), (4) Date: Mar. 8, 2010

(87) PCT Pub. No.: WO2008/155063
PCT Pub. Date: Dec. 24, 2008

(65) Prior Publication Data
US 2010/0162901 A1    Jul. 1, 2010

(30) Foreign Application Priority Data

Jun. 21, 2007    (DE) ..................... 20 2007 008 815 U (51) Int. Cl.
*A23F 3/00*    (2006.01)
*A23L 2/54*    (2006.01)
*B01F 3/04*    (2006.01)

(52) U.S. Cl.
USPC ........................................................ 99/323.1

(58) Field of Classification Search .............. 99/323.1, 99/302 R, 295, 289 R, 285, 282, 279.275; 53/440; 426/118; 399/262; 222/54, 494; 215/232; 206/63.5; 141/103
See application file for complete search history.

(56) References Cited

U.S. PATENT DOCUMENTS

| | | | | |
|---|---|---|---|---|
| 2,643,026 A | * | 6/1953 | Craig et al. ................. | 222/644 |
| 2,699,272 A | * | 1/1955 | Menning ..................... | 222/413 |
| 3,325,031 A | * | 6/1967 | Singier ....................... | 215/247 |
| 4,390,552 A | * | 6/1983 | Niwa .......................... | 426/126 |
| 4,846,403 A | * | 7/1989 | Mivelaz ...................... | 239/201 |
| 5,040,024 A | * | 8/1991 | Fukuda et al. ............. | 399/106 |
| 5,513,777 A | * | 5/1996 | Yoda et al. .................. | 222/325 |
| 5,791,526 A | * | 8/1998 | Landais et al. ........... | 222/185.1 |
| 6,450,371 B1 | * | 9/2002 | Sherman et al. ........... | 222/361 |
| 6,786,356 B2 | * | 9/2004 | Geiger et al. ............... | 221/96 |
| 2006/0180607 A1 | * | 8/2006 | Guzmann et al. .......... | 222/54 |
| 2010/0162898 A1 | * | 7/2010 | Mahlich ..................... | 99/290 |
| 2010/0162901 A1 | * | 7/2010 | Mahlich ..................... | 99/323.1 |

FOREIGN PATENT DOCUMENTS

| | | |
|---|---|---|
| AU | 541 692 | 1/1985 |
| EP | 1 028 068 | 8/2000 |
| FR | 2 489 266 | 3/1982 |
| WO | WO 02/081308 | 10/2002 |
| WO | WO 2004/041043 | 5/2004 |

OTHER PUBLICATIONS

Abstract of FR2489266, 2012, 2 pages.*

* cited by examiner

*Primary Examiner* — Gene Kim
*Assistant Examiner* — M Chambers
(74) *Attorney, Agent, or Firm* — DLA Piper LLP (US)

(57) ABSTRACT

An exchangeable air and aroma tight sealed container for powdered drink constituents is designed as a multi-portion container (12) in order to permit a rational preparation scheme for a milk or milk foam generation.

6 Claims, 8 Drawing Sheets

MULTI-PORTION CONTAINER FOR POWDERED DRINK CONSTITUENTS

The present invention relates to an exchangeable air and aroma tight sealed multi-portion container for powdered drink constituents which includes drink constituents, particularly milk powder, for the preparation of a plurality of portions of beverages or milk foam and which is equipped with docking elements for docking to a docking device of a device for preparing beverages.

It constitutes the state of the art to provide devices for preparing beverages comprising a brewing unit which are provided for the use of ground loose coffee powder or pre-portioned coffee or cocoa portion units or milk concentrate or milk powder units. Portion units of this sort may be available in the form of aluminum or plastics capsules or in the form of pouches; they constitute one-portion capsules and the contents thereof are calculated for the preparation of a normal quantity of a beverage such as for instance one cup of coffee or a coffee-milk beverage each.

Such brewing units for using loose coffee powder or using pre-portioned units containing powdered drink constituents for preparing drinks constitute the state of the art and need not be described in detail. Likewise, the use of milk powder or milk concentrate in place of fresh milk for preparing milk foam for cappuccino, which is a combination of coffee and milk foam applied on it, has been known as well. In household preparation devices, milk powder or milk concentrate capsules are preferably used to this end.

In commercial coffee preparation devices, particularly in so-called vending machines, however, the milk powder is stocked in refillable containers stationary integrated in the preparation device, i.e. transported, for one cup each of the drink to be prepared, by worm conveyors into a mixing and foaming device, mixed up there with water and foamed up by means of a rotating foaming stirrer.

In Patent Application No. DE 20 2006 008 409.9, a milk powder foaming device has been described which calls up, program-controlled, from a milk powder container integrated in the preparation device, one milk powder portion each and produces in a special foaming device milk foam by adding preparation water and air. This solution differs from the foam stirrers used in vending machines in that the proper foaming-up occurs in a foaming chamber by rotation vortexing of milk and air rather than by means of a mechanical stirrer.

This kind of the portion-wise milk powder addition from a storage container has the advantage that it is not necessary to insert, for each cappuccino preparation, a new portion unit into the preparation device; the disadvantage, however, is that not each commercially available milk power is suited for milk foam generation, that unsuited milk power might be filled into the storage container and no milk foam of satisfying consistence will be obtained. In contrast to the addition of milk powder from a storage container, household coffee makers in particular make use of milk powder portion capsules, as mentioned already, in which only one milk powder portion each for one cup of cappuccino is contained. The portion units may be in the form of aluminum or plastic capsules and contain milk concentrate or milk powder that can be foamed up. In case of these portion capsules, the supply of the preparation water is realized by means of a water-conducting piercing needle which is pierced into the capsules. The water is in this case pumped, by means of a pump, from a water container and through a continuous-flow heater and via a hot water pipe to the piercing needles. Subsequently, the milk powder is dissolved in the capsule and is foamed up by means of a foaming device disposed in the capsule or, in case of capsules without an integrated foaming device, the milk obtained by dissolving is foamed up in a separate foaming device by the addition of air. This kind of milk foam preparation by means of portion capsules is used in coffee makers which for coffee preparation make use of pre-portioned coffee capsules, too.

The disadvantage of the use of one-portion milk powder capsules is that for each cappuccino preparation a new capsule has to be inserted and removed and that, in these devices for preparing drinks, which process capsules having different contents, i.e. capsules for coffee, cocoa, milk concentrate or milk powder, only one housing chamber for the various capsules is available. In such devices for preparing drinks, it is, therefore, unavoidably necessary that in view of the utilization of the same housing chamber for coffee, cocoa and milk concentrate or milk powder capsules, each second kind of preparation has to be performed in a second operational step. That means that for instance for a cappuccino preparation after the milk foam preparation cycle, first the used milk concentrate or milk powder capsule has to be removed from the brewing unit, subsequently the coffee capsule has to be inserted into the brewing unit and finally removed after the coffee preparation cycle. In this case, in addition, all capsules have the same water supply and beverage outlet means.

Determined by the system, this kind of preparation of a coffee milk drink is uneconomical since for each portion of a coffee milk drink two one-portion capsules are required and in view of the successively performed loading and removing processes is elaborate and time consuming.

A disadvantage of the stationary refillable milk powder containers is that non-foamable milk powder may be filled in as well and no milk foam of satisfactory consistence will be obtained.

Hence, it is an object of the present invention to provide a milk powder container by means of which the drink preparation, particularly coffee or cocoa preparation, as well as milk or milk foam generation, can be performed in a more economical preparation procedure wherein retardations by filling and removing processes are shortened or avoided altogether.

To this purpose, a milk powder container having the features of claim 1 is suggested.

The multi-portion container for milk powder, referred to in the following as multi-portion container, is provided for use in a drinks preparation device the brewing unit of which is equipped with a first receiving chamber in the form of a brewing chamber for receiving loose coffee powder or a coffee or cocoa portion unit and with a second receiving device having a docking device which is provided for receiving an air and aroma tight sealed exchangeable multi-portion container and to which a mixing and foaming device is associated which is suited for preparing milk or milk foam and which includes one outflow for the milk or milk foam prepared.

By means of this brewing unit, both the coffee or cocoa preparation, on one hand, and the milk or milk foam generation, on the other, may proceed simultaneously or timely staggered, depending on the setting or control of the brewing unit, while filling of the brewing unit with a one-portion milk powder capsule is not necessary for each and every milk beverage preparation.

According to the invention, the brewing unit is equipped, as already mentioned, in addition to a brewing chamber for receiving lose coffee powder or receiving a coffee portion capsule or a coffee pouch, with a receiving device in the form of a docking unit for receiving an encapsulated multi-portion container. This multi-portion container combines the advantage of the stationary large storage container so that it is not necessary to insert a new capsule for each cappuccino preparation, with the advantage of the one-portion capsule that positively only foamable milk powder is used and that it contains milk powder for a plurality of preparations of a coffee milk drink and may be introduced into the preparation device as an exchangeable part. Only the encapsulated and sealed capsule will warrant that only optimum foamable milk powder grades are used.

This kind of milk powder storage by means of a multi-portion container can be used in all coffee preparation devices independently from whether they are full automats equipped with coffee grinders or devices operating by means of brewing pistons for loose coffee power or by means of coffee portion capsules or coffee pouches, provided they are equipped with a respective docking device for the multi-portion container according to the invention and a mixing and foaming device. The conditioning and the foaming of milk powder may be performed both by mechanical stirring and by means of the rotation vortexing method. Such a brewing unit may be used in various ways; in order to solely prepare coffee, for instance, the coffee brewing chamber need be filled only with the loose coffee powder or with a coffee portion unit, or in order to prepare solely milk or milk foam, only one multi-portion container need by docked for a plurality of preparations; or for preparing a cappuccino or latte macchiato, the coffee brewing chamber should be filled with either coffee or a coffee portion unit, and for several preparations, only one multi-portion container need be docked. The brewing chamber and the docking device are usefully provided with checking means which in each case check the presence of a coffee portion unit or of a multi-portion container and will open, by means of a control arrangement, the preparation water supply by means of a motor-operated ceramics disc valve or by means of solenoid or hose valves disposed in the preparation water supply pipes, only if and when the respective position have been taken. In this way, a safe function of the brewing unit in case of alternate or simultaneous use of the brewing chamber and/or the docking device is assured.

An essential aspect of the brewing unit consists in that it may preferably be used for the preparation of a coffee milk drink of milk and milk foam. To this purpose, it is necessary that the milk power taken from the multi-portion container may be mixed in a mixing and foaming device and foamed up depending on the kind of drink desired. For this operation, to the docking device for the multi-portion container is associated a mixing and foaming device which is disposed below the docking device and is connected to its milk powder outlet. Nonetheless, it is possible to design the foaming device exchangeable for cleaning purposes or to realize it as an exchangeable throw-away part in order to assure a hygienic operation without time-consuming rinsing and cleaning processes. Structurally, both the coffee brewing chamber and the docking unit together with the mixing and foaming device may be designed compactly as a common structural unit. It is, however, also possible to design the coffee brewing unit and the docking unit including the mixing and the frothing device as separate units. Irrespective of whether the two devices are arranged integrated in a common structural element or separated from each other, the outlets of the two devices are usefully so arranged that they can conduct the produce prepared in them either into one single receiving vessel or into two receiving vessels arranged one next to the other. Instead of that, however, it is possible in both cases of arrangement of the brewing chamber and the mixing and foaming device in one structural unit or nonintegrated, to join their outlets together to form one common outlet channel in order to pass through it one homogeneous drinking produce or, timely one after the other two drinking produces into the receiving vessel. It is also possible to provide the brewing unit additionally with a steam outlet nozzle for the generation of milk foam from fresh milk. Moreover, for hygienic cleaning of the brewing chamber and of the mixing and foaming device, the brewing unit may be provided with a rinsing device which is to be activated for the two devices simultaneously, wherein rinsing may be performed either before or after a drinks preparation cycle.

For flexible preparation of a variety of drinks and for milk conditioning, particularly the preparation of milk foam, a pump conveys water from a water storage tank through a continuous-flow water heater and, by interposing a valve arrangement and a flow meter, into the coffee brewing chamber and/or the mixing and foaming device. The valve arrangement may be activated by a control arrangement so that water is supplied to the brewing chamber and to the mixing and foaming device either substantially simultaneously or is supplied to the two preparation devices timely staggered, or only to the brewing chamber or only to the mixing and foaming device. By means of the control arrangement, therefore, the activation of only one or of both preparation devices, the preparation sequence, and the amounts of water respectively to be dosed is controlled. Particularly for a coffee milk drink, the following possibilities will thereby result: Simultaneous preparation of coffee and milk or milk foam, or first brewing of coffee and subsequently preparation of milk foam, or first preparation of milk foam and subsequently brewing of coffee, or first preparation of milk, subsequently of milk foam and finally of espresso. Besides, the amount of water supplied and the quantity of the drink resulting thereof may be selected. The water supply into the brewing chamber and/or into the mixing and foaming device is effected, as already described, by means of a valve arrangement which is preferably controlled by outputs of the control arrangement and is disposed between the continuous-flow water heater and the brewing chamber or the mixing and foaming device. The controlled valve arrangement may be realized as a ceramics disc valve which is particularly suited for the preparation of high-quality drinks. The control valves may, however, also be realized as individual solenoid valves or as hose clip valves. Preparation water amount control may be performed by means of the valves referred to and controlled by flow meters provided in the supply pipes and the control arrangement or manually to conform to the subjective taste.

As mentioned above, checking units on the first receiving device and on the second receiving device may open, in combination with a control device, a water supply via the controlled valves to one of the preparation devices, or to both of them, only if and when a portion unit or a multi-portion container, respectively, has been placed in the receiving device.

To increase the operating reliability, it is advisable, according to claim 23, to provide furthermore means for a water supply stop in case of an opened coffee brewing chamber which permit a water supply to the coffee brewing chamber only if and when the coffee brewing chamber is closed, or interrupt the water supply if and when the coffee brewing chamber is being opened during the course of the preparation process.

The preparation of a desired drink may automatically be realized in that the sequence of the preparation of the drinks constituents and the quantity thereof, particularly for coffee and milk foam generation, is fixed-programmed. A plurality of such programs for a variety of drinks may advantageously be stored in the control arrangement and may be selected by means of a selection means.

For the multi-portion container according to the invention, a variety of structural shapes are possible. Preferred embodiments have in common that the multi-portion containers according to claim 12 are provided in the shape of a cylindrical cartridge which is solidly closed, according to claim 6, at its upper end with a cover and at its lower end is narrowed downwardly, according to claim 12, funnel-like, in the direction of the milk powder outlet and passes over to form a neck which is provided, according to claims 7 through 10, with a lower locking element of the multi-portion container and also carries, according to claims 2 through 5, the docking and locking elements for interaction with the docking elements of the drinks preparing device.

The locking element may, according to claims 8, 14, 15, 16, 17, be a locking cylinder or, according to claims 9, 18, 19, a hat-shaped cap or, according to claims 10, 20, 21, a locking foil. The docking device may, according to claim 3, be a bayonet catch or, according to claim 4, a thread or, according to claim 5, a snap lock.

Conceivable, however, is also a multi-portion container which, according to claim 11, is shaped over the entire length as a cylinder and the lower side of which is provided with a locking element which is opened during the course of the docking process by opening element of the docking device, and a chute funnel for the supply of the milk powder to the conveyor unit which conveys the milk powder to the mixing and foaming device constitutes part of the preparation device.

Embodiments of the invention will be described in more detail in the following based on a drawing including 29 figures from which further advantageous features of the invention might result.

Figure 1:
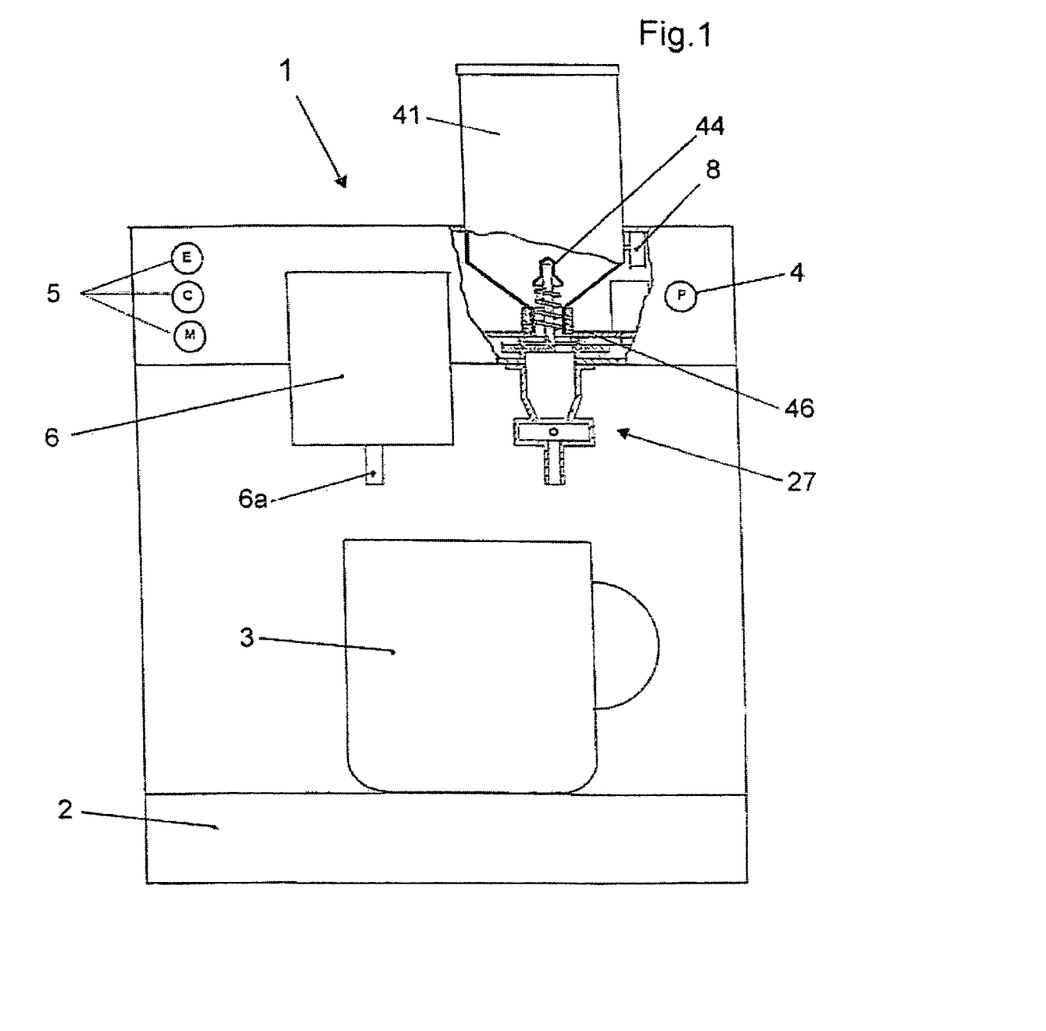
FIG. 1 is a diagrammatically represented device for preparing drinks, partly in cross section, comprising a coffee brewing unit for loose coffee powder and a docking device for a multi-portion container including a docked-on multi-portion container, partly in cross section, a presence checking means for the multi-portion container, a vertical ejection shaft for the locking cap of the multi-portion container including a worm conveyor, and a mixing and foaming device.

FIG. 1 shows a device for preparing drinks 1 comprising a base 2, a receiving vessel 3 and a coffee brewing chamber 6 and a multi-portion container 41 including an ejected locking cap 44, docked in docking device 7. Below the docking device 7, a mixing and foaming device 27 is disposed. In the docking device, a presence checking means 8 provided. To switch the preparation device on, a mains switch 4 and to select a drink, a group of program selection buttons 5 are provided.

Figure 2:
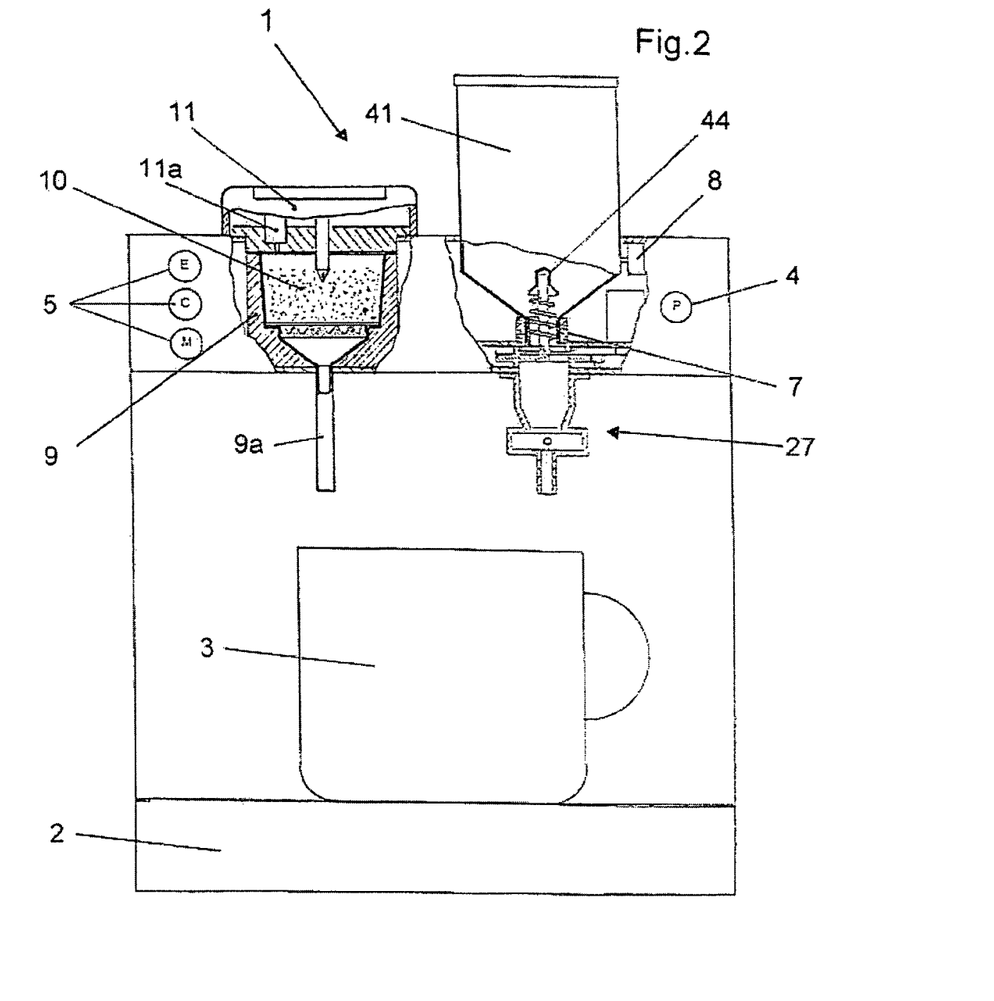
FIG. 2 is a diagrammatically represented device for preparing drinks, partly in cross section, comprising a brewing unit for a pre-portioned coffee capsule including an inserted coffee capsule, a docked-on multi-portion container, partly in cross section, a presence checking means for the multi-portion container, a vertical ejection shaft for the locking cap of the multi-portion container including a worm conveyor and a mixing and foaming device.

FIG. 2 shows a device for preparing drinks 1 comprising a base 2, a receiving vessel 3 and a coffee brewing chamber 6 in the form of a receiving device 9 for a coffee portion capsule with a coffee portion capsule 10 inserted, a water supply needle 11a pierced into the coffee portion capsule, a presence checking means 11a and an upper part 11 in the closed state, and a multi-portion container 41 docked in docking device 7 with the locking cap 44 ejected. Below the docking device 7, a mixing and foaming device 27 is disposed.

To switch the preparation device on, a mains switch 4 and to select a drink, a group of program selection buttons 5 is provided.

Figure 3:
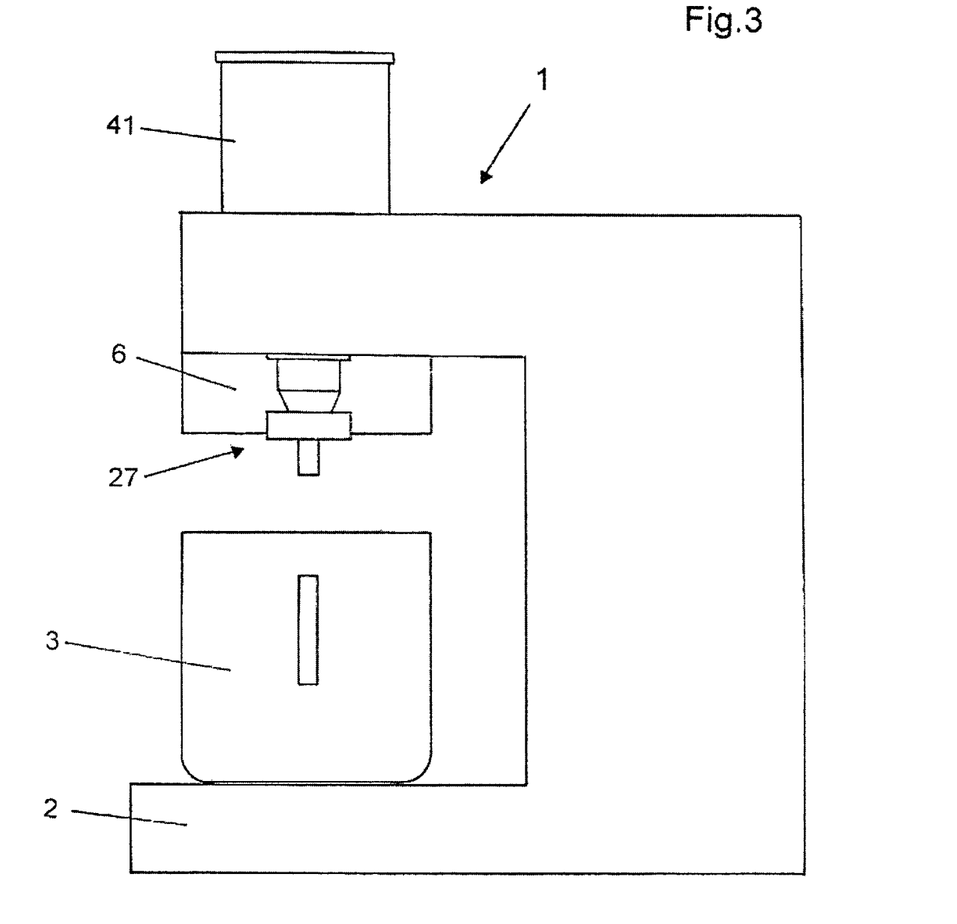
FIG. 3 is the side view of the device for preparing drinks of FIG. 1.

In FIG. 3, the preparation device 1 is shown as a side view including a base 2, a receiving vessel 3, a coffee brewing chamber 6, a docked multi-portion milk powder container 41 and a mixing and foaming device 27.

Figures 4, 4A, 5, 5A, 6:
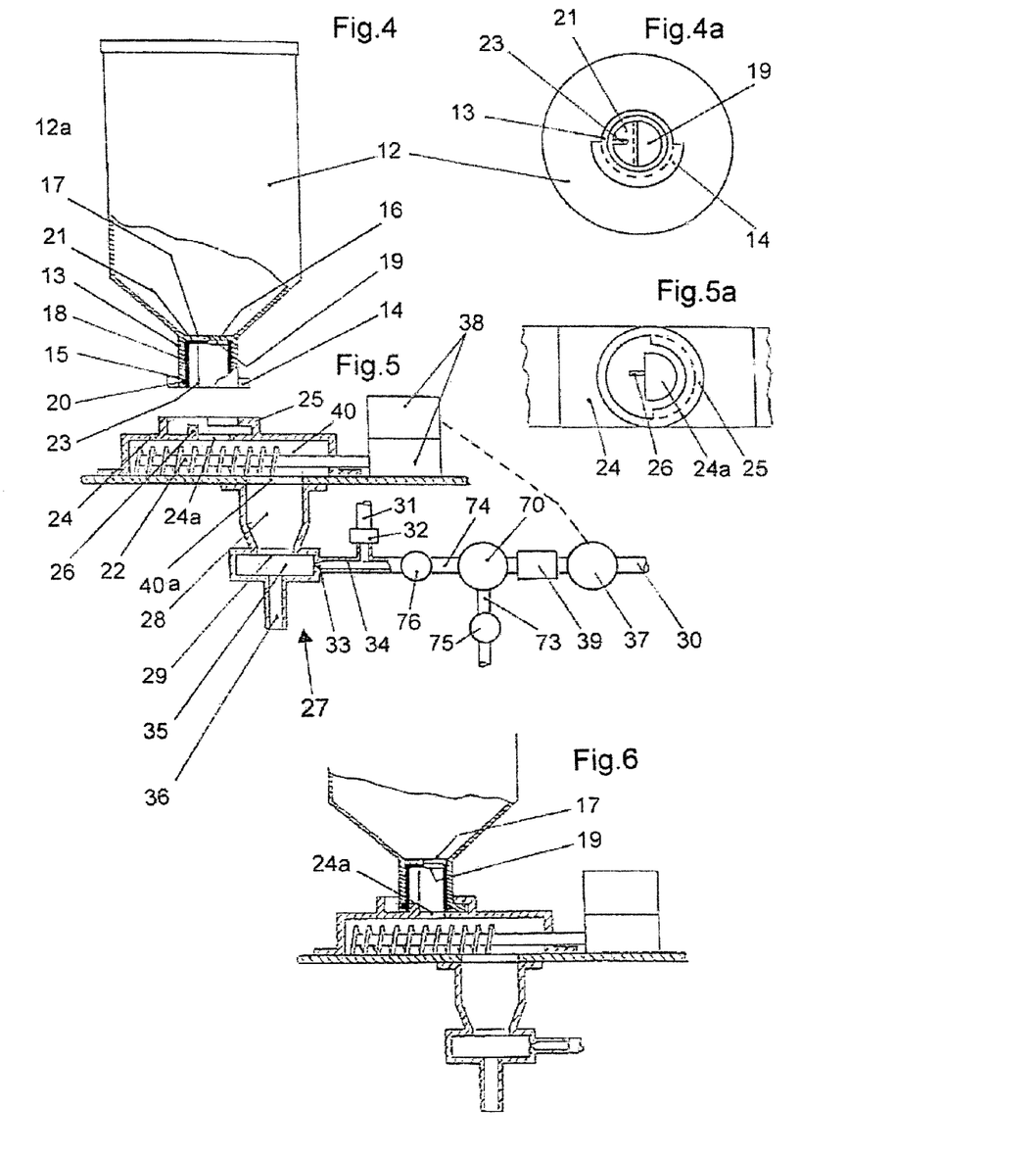
FIG. 4 is a cylindrical multi-portion container, partly in cross section, comprising a funnel like rejuvenating lower section passing over into a cylindrical neck, a partly open bottom provided inside at the neck projection, a rotary locking cylinder engaged in a groove provided in the neck and having a partly open upper side, wherein the closed portion of its upper side covers the partly open bottom of the multi-portion container bottom, a stop bar arranged on the locking cylinder and provided as a rotation protection for the locking cylinder, and a bayonet catch element disposed on the periphery of the neck.
FIG. 4a is the bottom view of the multi-portion container of FIG. 4.
FIG. 5 is a cross section through the bayonet docking device belonging to FIG. 4 for the multi-portion container including the milk powder conveyor track and the worm conveyor, a mixing and foaming device and a water pump, a continuous-flow water heater, a two-way valve, and two flow meters.
FIG. 5a is the top view of the bayonet docking device of FIG. 5.
FIG. 6 is, partly in cross section, the multi-portion container of FIG. 4 docked, and locked, to the docking device of the brewing unit, showing the multi-portion container with its bottom opening turned to "passage".

In the embodiment shown in FIGS. 4 and 4a of a multi-portion container, the locking cylinder 18 engaged with its engaging bulge 20 in the engaging groove 15 of the neck 13 of the multi-portion container 12 locks, with the locked section 21 of its upper side, the partial opening 17 of the multi-portion container bottom 16 so that the multi-portion container 12 is tightly locked. The neck 13 of the multi-portion container 12 is provided with a bayonet catch element 14 for docking in the docking device 24 of the brewing unit. For docking of the multi-portion container, the docking device is provided with a bayonet catch 25. The locking cylinder 18 is provided with a stop bar 23 which in combination with a holdback square 26 of the docking device 24 of the preparation device avoids a turn of the locking cylinder 18 during the docking process. Below the docking device 24 a conveying track 40 is provided which conveys by means of a worm conveyor 22 driven by a motor gear unit 38, the milk powder to a mixing and foaming device generally designated by 27. The conveying track 40 is provided with an aperture 40a through which the milk powder flows into the inlet of the mixing and foaming device. The mixing and foaming device 27 comprises essentially an inflow funnel 28, below the inflow funnel a foaming chamber 35 and below the latter an outflow track 36. These portions of the foaming device, as shown in the drawing, are concentrically arranged one above the other to form a virtual axle center and are essentially rotation symmetrically designed. An upper cover wall of the foaming chamber 35 is broken through in the middle by a powder inlet opening 29 and passes over via the latter into the inflow funnel 28 above it. The diameter of the circular powder inlet opening is smaller than the internal diameter of the foaming chamber. Starting from the powder inlet opening 29, the interior of the inflow funnel 28 expands progressively upward. Into the foaming chamber 35 opens a nozzle 33 which is disposed in the cylindrical wall of the foaming chamber 35 so that the nozzle ends open tangentially to an inner wall of the foaming chamber. The nozzle is disposed at about half the height of the cylindrical wall of the foaming chamber 35.

For foaming but also just for the preparation of a drink from dissolved milk powder, a water pipe 30 is connected upstream via a continuous flow heater 39 and a pump 37 with a water source, not shown. Downstream, it provides, via ceramics disc valve 70, the ceramics valve outlet 74 and a flow meter 76, the water inlet 34 for the nozzle 33 with hot water. Near the water inflow 34 into the nozzle 33, an air track 31 which is connected via a locking valve 32 with the outer atmosphere opens into the water inflow pipe 34. The locking valve 32 is opened for foam generation. In order to coordinate the conveying quantity of the powder by worm conveyor 22 with the water amount pumped by water pump 37, a drive (not shown) of water pump 37 is connected with the worm conveyor drive 38 via a coupling which is indicated in FIG. 4 by a broken line and which can be realized by a connecting gear or a common control arrangement of the gear drive in order to assure an optimal amount ratio of the milk powder to the hot water flow.

Figures 7, 8:
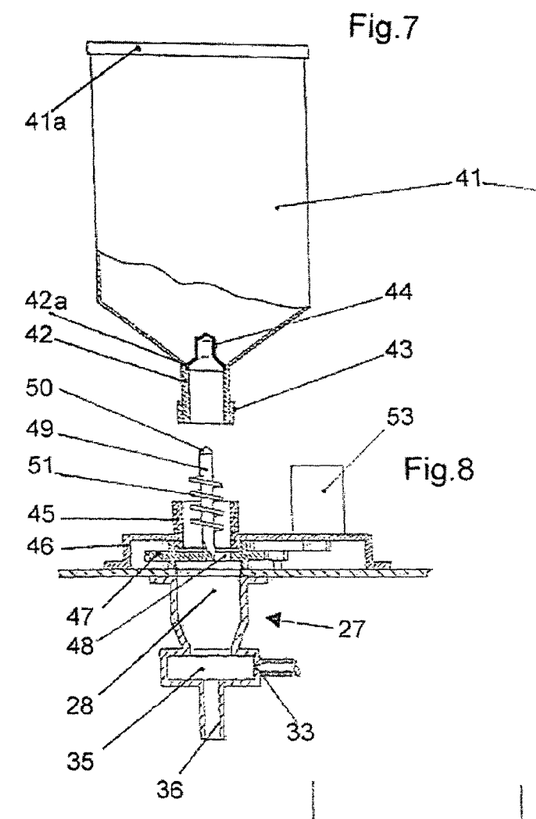
FIG. 7 is, partly in cross section, a cylindrical multi-portion container having a hat-shaped locking cap pressed into the inner side of the neck and a thread provided on the outside of the neck.
FIG. 8 is a cross section through the threaded docking device of FIG. 7 for the multi-portion container having an ejection shaft including a worm conveyor for conveying the milk powder into the mixing and foaming device.
Figure 7A:
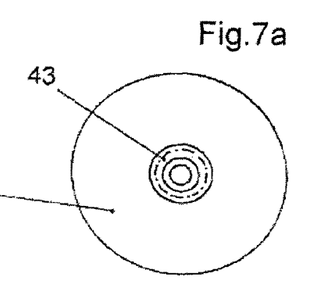
FIG. 7a is the bottom view of the multi-portion container of FIG. 7.
Figure 9:
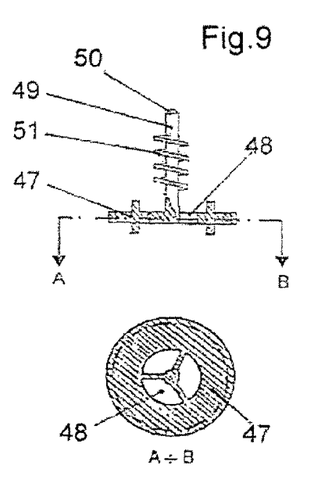
FIG. 9 is, partly in cross section, the shaft and the worm conveyor of FIG. 8 as a detail.
Figure 10:
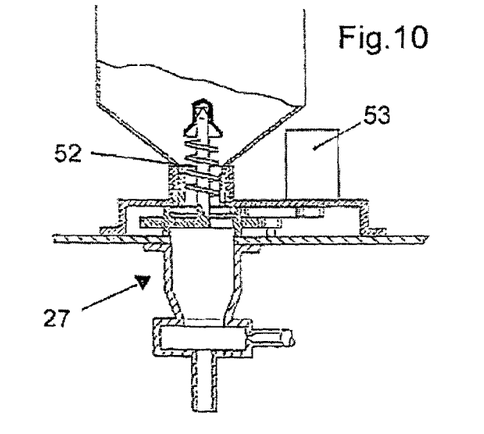
FIG. 10 is, partly in cross section, the docking device of FIG. 8 including the docked-on multi-portion container of FIG. 7 together with the vertically disposed shaft and the worm conveyor, the ejected locking cap and the mixing and foaming device.

The neck 42 of the embodiment shown in FIGS. 7 and 7a of a multi-portion container 41 is closed at the inner neck projection 42 by a hat-shaped locking cap 44. The hat-shaped cap 44 is pressed into the neck projection. On the external periphery of the neck 42, a thread 43 is formed out. The docking device 46 shown in FIG. 8 and belonging to this embodiment of a multi-portion container 41 is equipped with a threaded sleeve 45 which is provided with an internal thread. In the docking device 46, a worm vertical conveyor 51 is disposed. The worm conveyor 51 is provided with a drive gear 47 driven by a motor gear unit 53. The worm conveyor coils about a centrally disposed ejection shaft 49, the tip 50 of which is suited to push, during the course of the docking process, the locking cap 44 from its seat in the neck projection of the multi-portion container 41, as shown in FIG. 10, to the interior. The drive gear 47 of the worm conveyor is provided with apertures 48 for the passage of the milk powder. The mixing and foaming device 27 provided below the docking device 46 corresponds to that described in FIG. 4.

Figure 11:
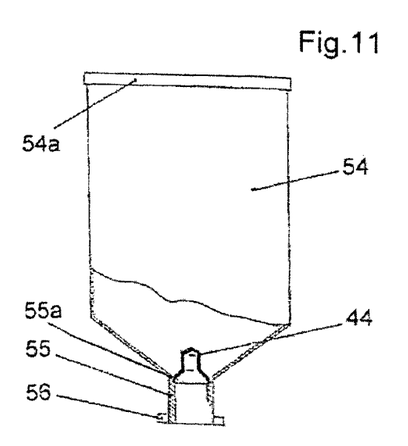
FIG. 11 is, partly in cross section, a cylindrical multi-portion container having a locking cap pressed into the inner side of the neck and a bayonet catch element disposed on the neck.
Figure 11A:
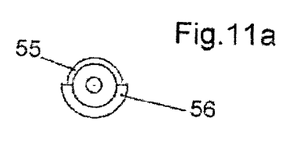
FIG. 11a is the bottom view of the multi-portion container of FIG. 11.

The embodiment of a multi-portion container 54 shown in FIGS. 11 and 11a and the respective docking device 46a differ from the embodiment 41 shown in FIGS. 7 and 7a only by bayonet catch devices 56 on the multi-portion container 54 and the bayonet catch 59a on the docking device 46a.

Figure 12:
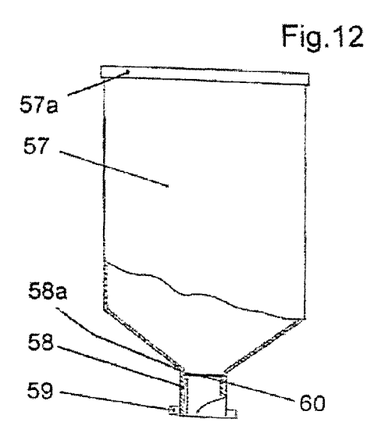
FIG. 12 is, partly in cross section, a cylindrical multi-portion container having a locking foil disposed, inside, at the projection of the neck, and a bayonet catch element disposed on the neck.
Figure 12A:
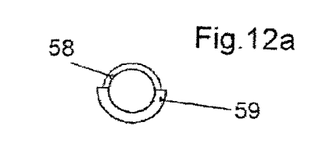
FIG. 12a is the bottom view of the multi-portion container of FIG. 12.
Figure 13:
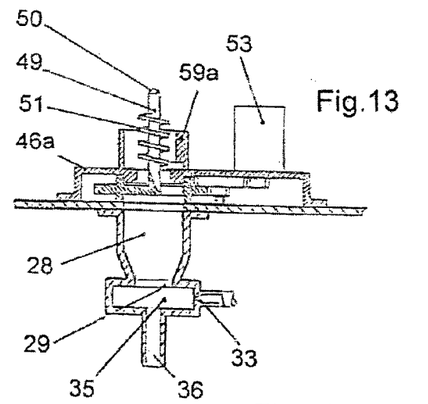
FIG. 13 is a cross section through the bayonet docking device of FIGS. 11 and 12 for the multi-portion container and the ejection shaft for the locking cap of the multi-portion container of FIG. 11 or the locking foil of the multi-portion container of FIG. 12 and the mixing and foaming device.
Figure 13A:
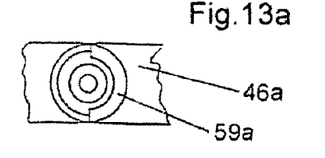
FIG. 13a is the top view on the bayonet docking device of FIG. 13.
Figure 13B:
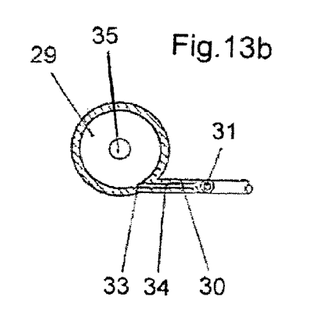
FIG. 13b is a cross section through the foaming chamber of the mixing and foaming device at the level of the nozzle entry to the water supply.

In the case of the embodiment of a multi-portion container 57 shown in FIGS. 12 and 12a, the latter is closed at its inner neck projection 57a by a locking foil 60. In the respective docking device 46a, a vertical worm conveyor 51 is disposed as well which is provided with a drive gear 47 driven by a motor gear unit 53. The worm conveyor coils about a centrally disposed ejection shaft 49 the tip 50 of which is suited to pierce during the course of the docking process through the locking foil 60 in the neck projection 57a of the multi-portion container. The gear wheel 47 of the worm conveyor 51 is provided with apertures 48 for the passage of the milk powder. The docking elements 59 and 59a are shaped in the form of a bayonet catch.

Figure 14:
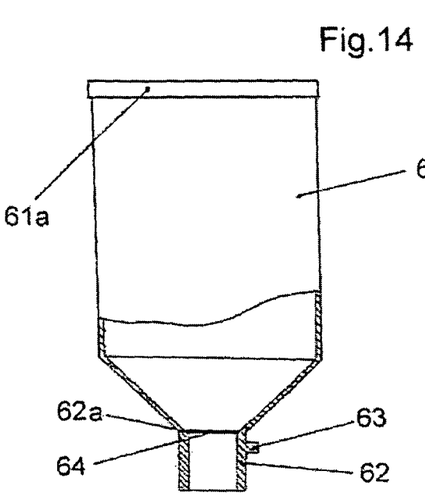
FIG. 14 is, partly in cross section, a cylindrical multi-portion container including a locking foil disposed inside in front of the neck, and a bayonet catch element disposed on the neck.
Figure 14A:
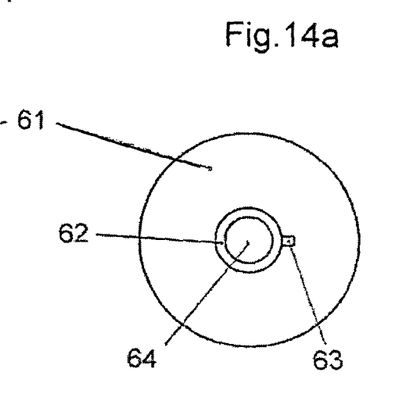
FIG. 14a is the bottom view of the multi-portion container of FIG. 14.
Figure 15:
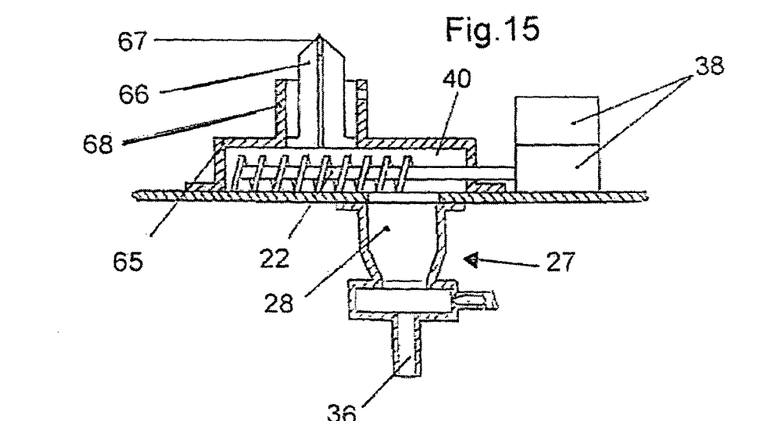
FIG. 15 is a cross section through the bayonet docking device belonging to the multi-portion container of FIG. 14 including a piercing needle for the locking foil, the milk powder conveyor and the mixing and foaming device.
Figure 16:
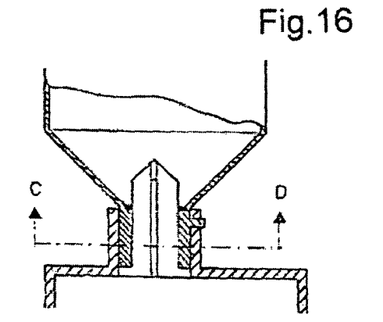
FIG. 16 is, partly in cross section, the docking device of FIG. 15 together with the docked-on multi-portion container of FIG. 14 showing the pierced-through locking foil and the mixing and foaming device.
Figure 16A:
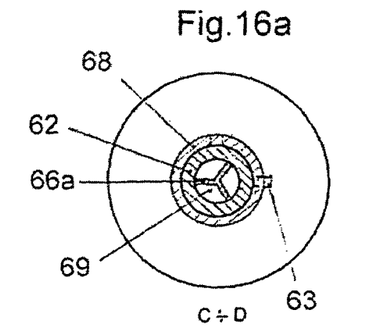
FIG. 16a is a cross section through the docking device of FIG. 16 including the docked-on multi-portion container.

The multi-portion container 61 shown in FIGS. 14 and 14a is closed, at its internal projection 62a by a locking foil 64. The docking device 65 is provided with a piercing needle 66 which is suited to pierce through the locking foil 64 during the course of the docking process. The piercing needle 66 is formed of at least three bars 66a radially extending from a vertical center axis and tapering at its upper end to form a common tip 67. The multi-portion container 61 and the docking device 65 are provided with bayonet catch devices 63 and 68.

All multi-portion milk powder containers and the respective docking devices are preferably provided with a bayonet or threading docking device. It is also conceivable to produce the docking devices in the form of a snap lock or in another docking structure.

Figure 17:
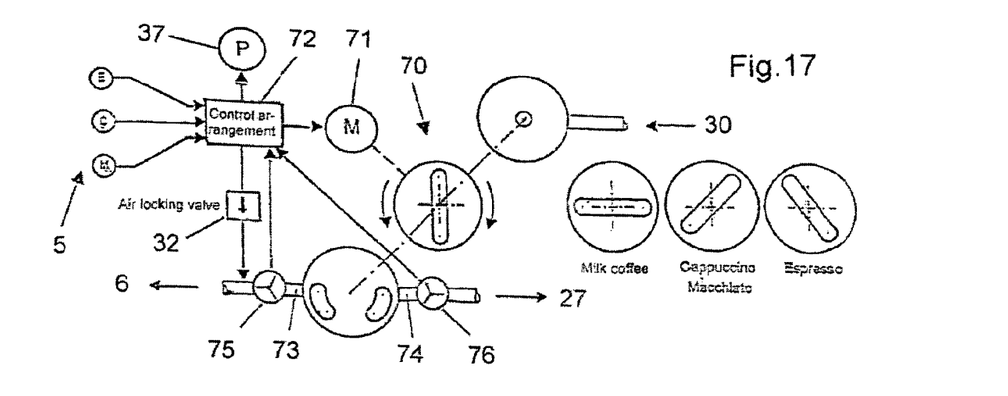
FIG. 17 shows, diagrammatically in a disassembled representation, a two-way ceramics disc valve for the hot water supply to the coffee brewing chamber and/or the mixing and foaming device.

In FIG. 17, the two-way ceramics disc valve 70 which is connected to the hot water supply pipe 30 is shown by three ceramics discs displayed in a disassembled form. Of these three discs, one outer disc shows an outlet 73 which feeds, via a flow meter 75, the brewing water supply to the coffee or cocoa brewing chamber 6 with brewing water, and a further outlet 74 which is connected, via a flow meter 76, with the hot water supply pipe to the mixing and foaming device 27. Depending on the position of the middle disc of the ceramics valve 70, either the outlet 73 or the outlet 74, or both outlets simultaneously, may be used for the preparation of coffee or milk foam. In the position of the middle disc of the ceramics valve shown on the left part of FIG. 4, it is in its zero position. In order to prepare a drink, the disc may be turned, either by hand or program-controlled by means of a motor 71, successively into the position "espresso" or "milk/milk foam", "latte macchiato" or "milk coffee", depending on the kind of drink desired. These possible positions are shown for the middle disc on the right part of FIG. 17. After one preparation cycle, the disc is returned into its zero position, either automatically or manually, or suitably coupled with the opening process of the brewing chamber.

Figure 18A:
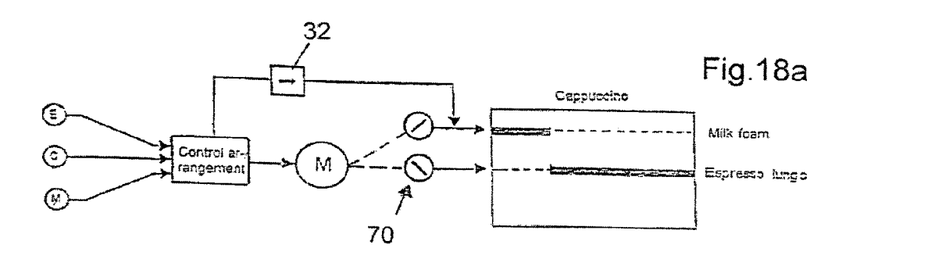
FIG. 18a shows diagrammatically the position of the ceramics disc valve and of an air locking valve for the preparation of cappuccino, and a respective flow chart.
Figure 18B:
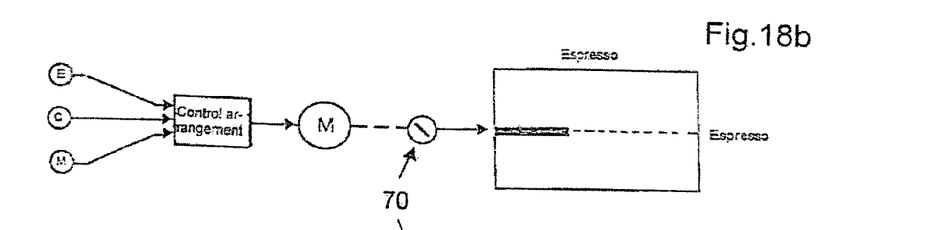
FIG. 18b shows diagrammatically the position of the ceramics disc valve and of an air locking valve for the preparation of espresso, and a respective flow chart.
Figure 18C:
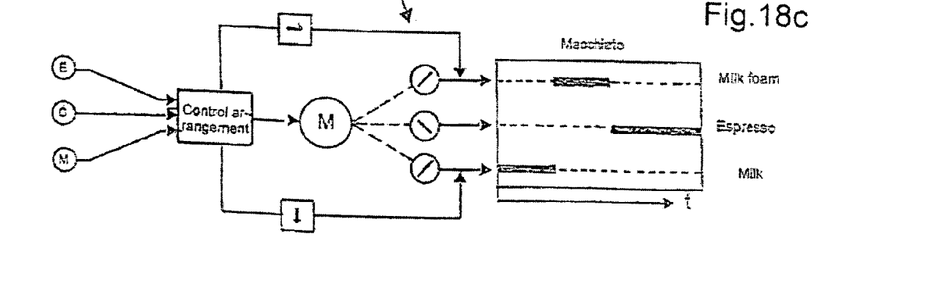
FIG. 18c shows diagrammatically the position of the ceramics disc valve and of an air locking valve for the preparation of latte macchiato, and a respective flow chart.

In the FIGS. 18a, 18b, 18c, the respective position of the ceramics valve 70 and of the air locking valve 32, and the respective preparation flow chart for the preparation of cappuccino, espresso or latte macchiato is shown.

For the preparation of a coffee or coffee/milk drink, the following possibilities are available:

In order to prepare coffee, the brewing chamber 6 is filled with either loose coffee powder or a pre-portioned coffee portion unit 10. The filling of the brewing chamber 6 with either loose coffee powder or with a coffee or cocoa portion unit 10 differs depending on the structural form and the embodiment of the device for preparing drinks; they constitute the state of the art and need not be described in detail. After filling the brewing chamber 6 with coffee or a coffee portion unit 10 and switching the preparation device on by means of a mains switch 4, the coffee/espresso preparation is called up by means of the group of program selection buttons 5 or a program selection switch, and by means of control arrangement 72, the valve arrangement 70 is switched so that the brewing water is supplied to the coffee brewing chamber 6 only. During the course of the brewing process, the coffee liquid will then flow via the outlet track into the receiving vessel 3.

For the preparation of a milk drink and depending on the structural form, the multi-portion container is docked by means of its docking device to the respective docking device of the device for preparing drinks, in that it is tightly locked by means of its bayonet catch element 14, 56, 59, 63 and the corresponding bayonet catch 25, 59a, 68 of docking device 24, 46, 46a, 65 by a rotating movement or by screwing by means of its docking thread 43 into the threaded sleeve 45 of docking device 46. In this case, it can be checked by a checking means which for instance is realized by a micro switch 8 and a control arrangement 72 whether or not a multi-portion container is presently in the docking device.

After switching the preparation device on by means of mains switch 4, the kind of drink is called up by means of a group of program selection buttons 5 or a program selection switch and, by means of the control arrangement 72, the valve arrangement 70 is switched so that the hot water is supplied either to the coffee brewing chamber 6 only or to the mixing and foaming device 27 only or to both devices.

In a first embodiment of a multi-portion container, the multi-portion container, as shown by FIG. 4, is closed by means of a locking cylinder 18 disposed on its neck. The locking cylinder 18 is pivotally engaged by means of an engaging bulge 20 in an engaging groove 15 of the neck and covers, in the rest position, with the closed half 21 of its upper side, the opening 17 of the milk powder container bottom 16 so that the multi-portion container 12 is tightly closed. For docking the multi-portion container 12 to the docking device 24, it is inserted with its neck 13 which is provided with a bayonet catch element 14 into the bayonet catch 25 of the docking unit 24 and manually turned about 180 degrees up to the stop. In this way, the multi-portion container is solidly locked by means of bayonet catch element 14 and bayonet catch 25 of the docking unit 24. During the turning, the stop bar 23 of the locking cylinder 18 is held back by the hold back square 26 of the bayonet docking device 25 and in this way, rotation of the locking cylinder is avoided. By this, the passage openings 17 of the multi-portion container bottom 16 and the passage opening 19 of the locking cylinder 18 are in coincidence, and the milk powder flows through the aperture 24a of docking device 24 into the conveying track 40 and is conveyed by worm conveyor 22 to the mixing and foaming unit 27 during the course of which passage it falls through the aperture 40a into the inflow funnel 28 of the mixing and foaming device 27. For the preparation of milk foam, the motor gear unit 38 of the worm conveyor and the water pump 37 for passing the preparation water are synchronously started. The worm conveyor 22 conveys the milk powder into the inflow funnel 28 of the mixing and foaming unit 27. At the same time, the water pump 37 pumps fresh water from a container, not shown, via a water supply pipe 30 through a continuous-flow heater 39 and a ceramics disc valve 70 into the foaming chamber 35 of the mixing and foaming unit 27. The conveyed quantities of milk powder and water are programmed and tuned to one another. The foaming chamber 35 is disposed below the inflow funnel 28 and is cylindrically constructed. It is connected to the inflow funnel 28 through an upper inlet opening 29 the diameter of which is smaller than the diameter of the foaming chamber. In the downward direction, the foaming chamber is connected with an outflow track 36. The water inflow into the foaming chamber 35 occurs tangentially through a nozzle 33 in about half the height of the cylindrical foaming chamber 35. Shortly before the inflow of the hot water jet into the foaming chamber, an air pipe 31 opens into the hot water supply pipe 30 so that the water flowing with high speed through the water inflow pipe 34 will drag the air along. By the tangential inflow, the water-air mixture is brought into a rapid rotation in the cylindrical foaming chamber 35 and exits partly from the foaming chamber 35 upward into the inflow funnel 28 and, caused by the upwardly enlarging shape of the inflow funnel 28, mounts up in it and mixes there with the inflowing milk powder. During the course of this, the resulting milk-air mixture loses rotation energy and drops, within the upwardly mounting water vortex, back into the foaming chamber 35 where it is brought again into more rapid rotation by the newly inflowing water, and is foamed up. Since water and milk powder continue to flow in, a continuous mixing and foaming process comes up, wherein the resulting milk foam is pushed downwardly out of the foaming chamber and flows off via the outflow track 36. The air pipe 31 is provided with an air valve 32 which permits to interrupt the air supply to the water pipe 30. This makes possible to prepare solely hot milk instead of milk foam. During the course of the milk foam generation, the air locking valve 32 disposed in the air pipe 31 is open. If, on the other hand, the air locking valve 32 is closed which can be effected either manually or, programmed, automatically and the air supply to the foaming cylinder 35 consequently is blocked, foam generation in it is substantially precluded, and from the outflow track of the foaming cylinder only hot milk will flow out. It is, therefore, possible to generate, program-controlled, in one operational sequence milk—milk foam—espresso for the preparation of latte macchiato. In order to remove the multi-portion container 12, it is turned back about 180 degrees and in this way the bayonet receiving device is unlocked.

In a second embodiment of the multi-portion container, the neck 42 of the multi-portion container is provided with an outside screw thread 43. Into the neck 42 of the multi-portion container, a hat-shaped locking cap is pressed in. When docking to the docking device 46a, the neck of the multi-portion container 41 is inserted into the threaded sleeve 45 of the docking device 46a and screwed on to the stop. At the same time, the ejection shaft 49 moves together with the worm conveyor 51 into the neck 55 of the multi-portion container 54, and the tip of the shaft 49 ejects the locking cap 44 out of its locking position. Through the resulting annular chute aperture 52, the milk powder flows into the worm conveyor 51. In view of the hat-shaped form of the locking cap, it remains on the ejection shaft 49 and cannot fall into the chute aperture 52. For the preparation of milk foam, both the motor gear unit 53 of the worm conveyor 51 and the water pump 37 which is programmed for the transportation of hot water and milk powder in a tuned amount ratio, are synchronously started. The motor gear unit 53 drives in this case the worm conveyor gear wheel 47 which constitutes one structural unit together with the worm conveyor 51, and the milk powder is conveyed by the worm conveyor 51 through the worm conveyor gear wheel aperture 48 vertically into the inflow funnel 28 of the mixing and foaming device 27. Water supply and foaming process are identical to the first embodiment. The resulting milk foam flows also via the outflow track 35 into the receiving vessel. For removing, the multi-portion container is screwed out of the threaded sleeve 45. In a further embodiment of a multi-portion container, it is also equipped with a hat-shaped locking cap 44; for the docking process, however, the multi-portion container 54 is provided with a bayonet catch element 56.

In a third embodiment of a multi-portion container, the closure of the multi-portion container 57 is realized by a locking foil 60 disposed on the internal neck projection 57a. Docking of the multi-portion container 57 on the docking device 46a and locking is realized by the bayonet catch element 59 disposed on the neck 58 of the multi-portion container 57 and by a bayonet catch sleeve 59a on the docking device 46a. During the course of the docking process, the tip 50 of the ejection shaft 49 of the worm conveyor 51 pierces through the locking foil 60 and, through the aperture 52 obtained, the milk powder flows into the worm conveyor 51, and the latter transports the milk powder vertically directly into the inflow funnel 28 of the mixing and foaming device 27. The mixing and foaming process is identical to the first embodiment. The milk foam generated flows also via the outflow track 36 into the receiving vessel.

In a fourth embodiment of a multi-portion container, the multi-portion container 61 is also closed by a locking foil provided at its internal neck projection 62a. Docking and locking of the multi-portion container 61 is realized by means of a bayonet catch element 63 on the neck 62 of the multi-portion container 61 and a bayonet catch 68 of the docking device 65. During the course of the docking process, the piercing needle 66 disposed on the docking device 65 pierces, with the tip of its radially disposed vertical bars 66a, through the locking foil 64, and the milk powder flows through the free space 69 between the bars 66a in to the conveying track 40 and is transported by the worm conveyor 22 into the inflow funnel 28 of the mixing and foaming device 27.

The mixing and foaming process is identical to the first embodiment. The milk foam generated flows also via the outflow track 36 of the foaming chamber 35 into the receiving vessel 3.

For the preparation of a coffee milk drink, the coffee brewing chamber 6 is filled with coffee, and a multi-portion container is docked on the docking device.

The preparation of a coffee milk drink is realized either manually or, program-controlled, successively, as shown in FIGS. 18a and 18c, in the following sequence:

For cappuccino: First: preparation of the milk foam, then preparation of espresso For latte macchiato: First: preparation of milk, then milk foam, then espresso.

| Reference numerals | |
|---|---|
| 1 | Device for preparing drinks |
| 2 | Base of the device |
| 3 | Receiving vessel |
| 4 | Mains switch |
| 5 | Group of program selection buttons |
| 6 | Coffee brewing chamber |
| 6a | Coffee outlet |
| 7 | Docking device |
| 8 | Checking means |
| 9 | Coffee capsule receiving device |
| 9a | Coffee outlet |
| 10 | Coffee capsule |
| 11 | Receiving device upper part |
| 11a | Checking means |
| 12 | Multi-portion milk powder container |
| 12a | Multi-portion milk powder container lid |
| 13 | Multi-portion milk powder container neck |
| 14 | Bayonet element |
| 15 | Engaging bulge |
| 16 | Multi-portion milk powder container bottom, locked portion |
| 17 | Multi-portion milk powder container bottom, open portion |
| 18 | Locking cylinder |
| 19 | Locking cylinder lid, open portion |
| 20 | Engaging groove |
| 21 | Locking cylinder lid, locked portion |
| 22 | Worm conveyor |
| 23 | Stop bar |
| 24 | Docking device |
| 25 | Bayonet catch |
| 26 | Hold-back square |
| 27 | Mixing and foaming device |
| 28 | Inflow funnel |
| 29 | Upper inlet opening |
| 30 | Hot water pipe |
| 31 | Air pipe |
| 32l | Locking valve |
| 33 | Nozzle |
| 34 | Hot water inflow pipe |
| 35 | Foaming chamber |
| 36 | Outflow track |
| 37 | Water pump |
| 38 | Motor gear unit |
| 39 | Continuous flow heater |
| 40 | Conveying track |
| 40a | Aperture |
| 41 | Multi-portion milk powder container |
| 41a | Multi-portion milk powder container lid |
| 42 | Multi-portion milk powder container neck |

| Reference numerals | |
|---|---|
| 42a | Internal neck projection |
| 43 | Docking thread |
| 44 | Locking cap |
| 45 | Threaded sleeve |
| 46 | Docking device |
| 47 | Drive gear |
| 48 | Gear wheel apertures |
| 49 | Ejection shaft |
| 50 | Worm conveyor shaft tip |
| 51 | Worm conveyor |
| 52 | Chute aperture |
| 53 | Motor gear unit |
| 54 | Multi-portion milk powder container |
| 54a | Multi-portion milk powder container lid |
| 55 | Multi-portion milk powder container neck |
| 55a | Internal neck projection |
| 56 | Bayonet catch element |
| 57 | Multi-portion milk powder container |
| 57a | Multi-portion milk powder container lid |
| 58 | Multi-portion milk powder container neck |
| 58a | Internal neck projection |
| 59 | Bayonet catch element |
| 60 | Locking foil |
| 61 | Multi-portion milk powder container |
| 61a | Multi-portion milk powder container lid |
| 62 | Multi-portion milk powder container neck |
| 62a | Internal neck projection |
| 63 | Bayonet catch element |
| 64 | Locking foil |
| 65 | Docking device |
| 66 | Piercing needle |
| 66a | Piercing needle bars |
| 67 | Piercing needle tip |
| 68 | Bayonet catch sleeve |
| 70 | Ceramics disc valve |
| 71 | Motor |
| 72 | Control arrangement |
| 73 | Ceramics disc valve outlet |
| 74 | Ceramics disc valve outlet |
| 75 | Flow meter |
| 76 | Flow meter |

The invention claimed is:

1. An exchangeable air and aroma tight sealed multi-portion container for powdered drink constituents in a device for preparing drinks, said device including a brewing unit, said multi-portion container being equipped with a docking device which is associated to a docking device of said brewing unit, wherein said multi-portion container is closed at its bottom end by a closure element configured to be opened by at least one opening element of said docking device of said brewing unit, said multi-portion container comprising:
said docking device;
said closure element; wherein
said multi-portion container is cylinder-shaped and in its lower section is narrowed and passes into a cylindrical neck,
said multi-portion container is closed on its neck by a partly open bottom;
said closure element is a rotary locking cylinder
the rotary locking cylinder having a partly open lid is disposed in said neck of said multi-portion container, and
the closed portion of said locking cylinder lid locks and covers, in one position, an open section of said multi-portion container bottom.

2. The multi-portion container in a device for preparing drinks according to claim 1, wherein
said docking device of said multi-portion container is a bayonet catch.

3. The multi-portion container in a device for preparing drinks according to claim 1, wherein
said docking device of said multi-portion container is a thread.

4. The multi-portion container in a device for preparing drinks according to claim 1, wherein
said multi-portion container is locked at its upper end by a lid.

5. The multi-portion container in a device for preparing drinks according to claim 1, wherein
a stop bar is arranged in said locking cylinder.

6. The multi-portion container in a device for preparing drinks according to claim 1, wherein
said open-lid section of said locking cylinder, when docked to said docking device, is congruent with said open section of said multi-portion container bottom.

* * * * *